United States Patent
Hojeij et al.

(10) Patent No.: US 11,515,986 B2
(45) Date of Patent: Nov. 29, 2022

(54) METHOD AND APPARATUS FOR USER DISTRIBUTION TO SUB-BANDS IN MULTIPLE ACCESS COMMUNICATIONS SYSTEMS

(71) Applicants: INSTITUT MINES-TELECOM, Palaiseau (FR); UNIVERSITE LIBANAISE, Beirut (LB); UNIVERSITE SAINT-ESPRIT DE KASLIK, Jounieh (LB)

(72) Inventors: Marie-Rita Hojeij, Mont Liban (LB); Charbel Abdel Nour, Brest (FR); Joumana Farah, Mont Liban (LB); Catherine Douillard, Prest (FR)

(73) Assignees: INSTITUT MINES-TELECOM, Palaiseau (FR); UNIVERSITE LIBANAISE, Beirut (LB); UNIVERSITE SAINT-ESPRIT DE KASLIK, Jounieh (LB)

(*) Notice: Subject to any disclaimer, the term of this patent is extended or adjusted under 35 U.S.C. 154(b) by 137 days.

(21) Appl. No.: 17/042,453

(22) PCT Filed: Mar. 20, 2019

(86) PCT No.: PCT/EP2019/057003
§ 371 (c)(1),
(2) Date: Sep. 28, 2020

(87) PCT Pub. No.: WO2019/185427
PCT Pub. Date: Oct. 3, 2019

(65) Prior Publication Data
US 2021/0083814 A1 Mar. 18, 2021

(30) Foreign Application Priority Data
Mar. 28, 2018 (EP) ...................................... 18305352

(51) Int. Cl.
*H04L 5/00* (2006.01)
*H04W 52/32* (2009.01)
(Continued)

(52) U.S. Cl.
CPC ............ *H04L 5/006* (2013.01); *H04L 5/0005* (2013.01); *H04L 5/0032* (2013.01); *H04W 52/32* (2013.01);
(Continued)

(58) Field of Classification Search
None
See application file for complete search history.

(56) References Cited

U.S. PATENT DOCUMENTS

| 2011/0255436 A1* | 10/2011 | Jian | H04B 7/063 370/252 |
| 2018/0295651 A1* | 10/2018 | Cao | H04W 72/14 |

(Continued)

OTHER PUBLICATIONS

Hojeij, et al., "New Optimal and Suboptimal Resource Allocation Techniques for Downlink Non-orthogonal Multiple Access", Wireless Personal Communications, vol. 87, No. 3, pp. 837-867, May 10, 2015.
(Continued)

*Primary Examiner* — Gregory B Sefcheck
*Assistant Examiner* — Amarnauth G Persaud
(74) *Attorney, Agent, or Firm* — BakerHostetler

(57) ABSTRACT

A mechanism is presented for attributing users to one or more of a plurality of sub-bands in a multiple access communications system, wherein in an initial assignment phase, a first user is selected for a sub band, for example on the basis of a user priority. Users having complementary channel gains to that of the first user are identified, and then a second sub-band user maximizing a performance metric reflecting the achieved throughput, and/or fairness across
(Continued)

users, is selected to accompany the first user on that sub-band. The initial assignment phase may terminate once all users have been assigned to a sub-band once. After the first phase is complete, the first user for each sub-band may be the user whose achieved total throughput is furthest from a target throughput defined for that user, wherein each user is assigned to the remaining sub-band to which no first user is currently attributed offering the highest channel gain for that user. Mechanisms for determining user priority, making provisional and definitive power allocations, and performance metrics are proposed.

15 Claims, 5 Drawing Sheets

(51) Int. Cl.
*H04W 72/04* (2009.01)
*H04W 72/10* (2009.01)

(52) U.S. Cl.
CPC ... *H04W 72/0453* (2013.01); *H04W 72/0473* (2013.01); *H04W 72/10* (2013.01)

(56) References Cited

U.S. PATENT DOCUMENTS

| 2019/0013911 A1* | 1/2019 | Muruganathan | H04B 7/0452 |
| 2019/0021080 A1* | 1/2019 | Lei | H04L 27/362 |
| 2019/0059098 A1* | 2/2019 | Zhang | H04L 5/003 |

OTHER PUBLICATIONS

Kim, et al., "Iterative and greedy resource allocation in an uplink OFDMA system", 2004 IEEE 15th International Symposium on Personal, Indoor and Mobile Radio Communications, vol. 4, pp. 2377-2381, Sep. 5, 2004.
Tse, et al., "Fundamentals of Wireless Communication", Cambridge University Press, pp. 267-285, 2005.
"Simulation Results for DL MUST", ZTE, 3GPP TSG RAN WG1 Meeting #83, R1-156630, Nov. 2015.
Nikopour, et al., "SCMA for Downlink Multiple Access of 5G Wireless Networks", Global Communications Conference, Jan. 1, 2014.
"Simulation Results for DL MUST", ZTE, 3GPP TSG RAN WG1 Meeting #83, R1-156630, Nov. 15, 2015.
Endo, et al., "Uplink Non-orthogonal Access with MMSE-SIC in the Presence of Inter-cell Interference", Proc. 2012 IEEE Int. Symp. on. Wireless Commun. Syst, 2012.
Saito, et al., "System-Level Performance Evaluation of Downlink Non-orthogonal Multiple Access (NOMA)", Proc. IEEE 81st VTC, 2015.
Umehara, et al., "Enhancing user fairness in non-orthogonal access with successive interference cancellation for cellular downlink", Proc. International Conference on Communication Systems (ICCS 2012).
Mehrjoo, et al., "Design of Fair Weights for Heterogeneous Traffic Scheduling in Multichannel Wireless Networks", IEEE Trans. Commun., 58(10), (2010).
Gueguen, "Compensated Proportional Fair Scheduling in Multiuser OFDM Wireless Networks", Proc. IEEE International conference on Wireless Mobile Computing, Networking Communication, (2008).
Yang, C., "A Weighted Proportional Fair Scheduling to Maximize Best-Effort Service Utility in Multicell Network", Proc. IEEE International Symposium on Personal, Indoor and Mobile Radio Communications, (2008).
Saito, et al., "System-Level Performance of Downlink Non-orthogonal Multiple Access (NOMA) Under Various Environments", 2015 IEEE 81st Vehicular Technology Conference (VTC Spring), 2015.

* cited by examiner

METHOD AND APPARATUS FOR USER DISTRIBUTION TO SUB-BANDS IN MULTIPLE ACCESS COMMUNICATIONS SYSTEMS

CROSS-REFERENCE TO RELATED APPLICATIONS

This application is a National Stage of International patent application PCT/EP2019/057003, filed on Mar. 20, 2019, which claims priority to foreign European patent application No. EP 18305352.9, filed on Mar. 28, 2018, the disclosures of which are incorporated by reference in their entirety.

FIELD OF THE INVENTION

The present invention relates to the user distribution to sub-bands in multiple access communications system such as Non-Orthogonal Multiple Access (NOMA).

BACKGROUND OF THE INVENTION

With the proliferation of internet applications, it is expected that the mobile traffic volume supported by communication networks increases by 8 times between the end of 2016 and 2022. To respond favourably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access. By exploiting an additional multiplexing domain, the power domain, NOMA allows the cohabitation of multiple users per sub-band at the transmitter side, on top of the modulation layer which may be Orthogonal Frequency Division Multiplex (OFDM), Filter Bank Multi-Carrier (FBMC), Universal Filtered Multi-Carrier (UFMC), or other multiple carrier scheme, and relies on an interference cancellation technique at the receiver side, such as Successive Interference Cancellation (SIC). An attractive feature of NOMA is that it targets the increase of system capacity while improving user fairness. Therefore, most of the prior art dealing with NOMA considers the proportional fairness (PF) scheduler as a multiuser scheduling scheme for the trade-off between total user throughput or data rate and the user fairness that it provides. Examples of power allocation algorithms, jointly implemented with a NOMA-based PF scheduler used for the selection of users to be assigned to each sub-band are presented for example in "Uplink non-orthogonal access with MMSE-SIC in the presence of inter-cell interference" by Y. Endo, Y. Kishiyama, and K. Higuchi. in proc. 2012 IEEE Int. Symp. on. Wireless Commun. Syst, 2012, or "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015.

In the article drafted by by Umehara, J., Kishiyama, Y., Higuchi, K. entitled "Enhancing user fairness in non-orthogonal access with successive interference cancellation for cellular downlink", in Proc. International Conference on Communication Systems (ICCS 2012), the authors propose a weighted PF-based multiuser scheduling scheme in a non-orthogonal access downlink system. A frequency block access policy is proposed for cell-interior and cell-edge user groups in fractional frequency reuse (FFR), with significant improvements in the user fairness and system frequency efficiency.

In the article by Mehrjoo, M., Awad, M. K., Dianati, M., Xuemin, S., entitled "Design of Fair Weights for Heterogeneous Traffic Scheduling in Multichannel Wireless Networks," IEEE Trans. Commun., 58(10) (2010), fair weights have been implemented for opportunistic scheduling of heterogeneous traffic types for OFDMA networks. For designing fair weights, the proposed scheduler takes into account average channel status and resource requirements in terms of traffic types. Simulation analysis demonstrates the efficiency of the proposed scheme in terms of resource utilization, and flexibility to network characteristics change due to user mobility.

In the article from Gueguen, C., Baey, S., entitled "Compensated Proportional Fair Scheduling in Multiuser OFDM Wireless Networks", in Proc. IEEE International conference on Wireless Mobile Computing, Networking Communication (2008), the problem of fairness deficiency encountered by the PF scheduler when the mobiles experience unequal path loss is investigated. To mitigate this issue, a modified version of the PF scheduler that introduces distance compensation factors has been proposed. It was shown that this solution achieves both high capacity and high fairness.

In the article by Yang, C., Wang, W., Qian, Y., Zhang X., entitled "A Weighted Proportional Fair Scheduling to Maximize Best-Effort Service Utility in Multicell Network, in Proc. IEEE International Symposium on Personal, Indoor and Mobile Radio Communications (2008), a weighted proportional fair algorithm is proposed in order to maximize best-effort service utility. The reason behind introducing weight factors to the PF metric is to exploit the inherent near-far diversity given by the path loss. The proposed algorithm enhances both best-effort service utility and throughput performance while maintaining similar complexity when compared to the PF metric.

If a downlink system with a single transmitter and receiver antenna is considered, the system consists of K users per cell, with a total system bandwidth B divided into S sub-bands, and a maximum allowable transmit power $P_{max}$ by the Base Station. Among the K users, a set of users $U_s=\{k_1, k_2, \ldots, k_n, \ldots, k_N\}$, is selected to be scheduled over each frequency sub-band s, ($1 \leq s \leq S$). N indicates the number of users non-orthogonally scheduled on a sub-band. The Successive Interference Canceller (SIC) process as described in Fundamentals of Wireless Communication, Cambridge University Press, 2005 by D. Tse, and P. Viswanath, is conducted at the receiver side, and the optimum order for user decoding is in the increasing order of the channel gains observed by users, normalized by the noise and inter-cell interference $$\frac{h_{s,k_n}^2}{n_{s,k_n}}$$

where $h_{s,k_n}^2$ is the equivalent channel gain at sub-band s, between user $k_n$ and the base station BS, and $n_{s,k_n}$ the average power of the Gaussian noise plus intercell interference received by user $k_n$. Assuming successful decoding and no SIC error propagation, and supposing that inter-cell interference is randomized such that it can be considered as white noise, the throughput of user $k_n$, at sub-band s, $R_{s,k_n}$, is given by:

$$R_{s,k_n} = \frac{B}{S}\log_2\left(1 + \frac{h_{s,k_n}^2 P_{s,k_n}}{\sum_{k_j \in U^s, \frac{h_{s,k_n}^2}{n_{s,k_n}} < \frac{h_{s,k_j}^2}{n_{s,k_{nj}}}} h_{s,k_n}^2 P_{s,k_j} + n_{s,k_n}}\right) \quad \text{Eq. (1)}$$

Where
K is the number of users per cell,
B is the total system bandwidth,
$k_n$ is a user n of K,
N is the number of users non-orthogonally scheduled on a sub-band,
$U^s = \{k_1, k_2, \ldots, k_n, \ldots k_N\}$, is the set of users selected to be scheduled over each frequency sub-band,
$k_j$ considers the users of $U^s$ having a channel gain greater than $k_n$,
S is the number of sub-bands in the system,
s is the sub band under consideration ($1 \leq s \leq S$).
$P_{max}$ is the maximum allowable transmit power, $$\frac{h_{s,k_n}^2}{n_{s,k_n}}$$

is the squared channel gain observed by user $k_n$, normalized by the noise and inter-cell interference where $h_{s,k_n}$ is the equivalent channel gain at sub-band s, between user $k_n$ and the base station BS, and $n_{s,k_n}$ the average power of the Gaussian noise plus intercell interference received by $k_n$, at sub-band s,
and $R_{s,k}(t)$ represents the throughput of user k on sub-band s.

The transmit power allocation constraint is represented by:

$$\sum_{s=1}^{S} P_s = P_{max}, \text{ with } P_s = \sum_{n=1}^{N} P_{s,k_n} \quad (2)$$

Where $P_s$ denotes the amount of allocated power on sub-band s.

Since the scheduler in NOMA may allocate a sub-band to more than one user simultaneously, the user scheduling policy affects system efficiency and user fairness as different policies may lead to preferential treatment of certain users in the interest of improved overall throughput, even if this means degraded service for other users, or vice versa.

The "Proportional Fairness" (PF) scheduler as introduced by the prior art references above is considered to achieve a trade-off between these two metrics. The objective of the PF scheduler is to maximize the long term averaged user rates, in order to ensure balance between cell throughput and user fairness. The PF algorithm is used in LTE (Long Term Evolution) for user scheduling (assignment of users to time-frequency resource blocks).

The operation of the PF scheduler is as follows: at the beginning of each scheduling slot t, each user provides the base station (BS) with its channel state. The BS can then compute the achievable throughput for each user (depending on the adopted power allocation strategy). The PF scheduler (operating at the BS side) keeps track of the average throughput achieved by each user in a past window of length $t_c$ and gives each user a priority inversely proportional to its average throughput.

At the beginning of each scheduling time slot t, each user k provides the base station with its channel gain on each sub-band s, s=1 . . . S.

The base station computes the corresponding achievable throughput for user k on sub-band s, $R_{s,k}(t)$.

At a time slot t, user k* is selected to be served on sub-band s based on:

$$k^* = \arg\max_{k=1\ldots K} \frac{R_{s,k}(t)}{T_k(t)} \quad (3)$$

A scheduler applying this approach gives each user a priority inversely proportional to its historical rate $T_k(t)$. If $T_k(t)$ is high, user k will possibly not be assigned any transmission rate for several time slots. This is problematic for applications requiring quasi-constant Quality of Experience (QoE), and may call for deep buffering. By the same token, this approach may raise difficulties for applications requiring low latency transmission.

The PF scheduling algorithm was initially devised for orthogonal multiple access schemes (OFDMA in LTE) but was later adapted for Non-Orthogonal Multiple Access (NOMA) schemes.

This scheduling policy has been adopted in the majority of proposed NOMA implementations. The scheduling algorithm keeps track of the average throughput $T_k(t)$ of each user in a past window of length $t_c$, where $t_c$ defines the throughput averaging time window (over a specified number of previous time slots). $T_k(t)$ is defined as:

$$T_k(t+1) = \left(1 - \frac{1}{t_c}\right)T_k(t) + \frac{1}{t_c}\sum_{s=1}^{S} R_{s,k}(t) \quad (4)$$

where $R_{s,k}(t)$ represents the throughput of user k on sub-band s, at time instance t. $R_{s,k}(t)$ is calculated based on Eq. (1) above, and can equal zero if user k is not scheduled on sub-band s.

In the case of NOMA, where N>1, the possible candidate user sets are enumerated:

$$C = \binom{N}{K}$$

combinations U of N users among K

At the beginning of each scheduling time slot t, each user k provides the base station with its channel gain on each sub-band s, s=1 . . . S. For each candidate user set U ($U \in \{U_1, \ldots, U_C\}$) on sub-band s, the base station computes the corresponding throughput for user k in set U, $R_{s,k|U}(t)$.

At time t, the selected user set is:

$$U_s = \arg\max_{U \in \{U_1\ldots U_C\}} \sum_{k \in U} \frac{R_{s,k|U}(t)}{T_k(t)} \quad (5)$$

Where $R_{s,k|U}(t)$ is the achievable throughput of user k on sub-band s at time t, considering user set U, $T_k(t)$ is the average throughput of user k in a past window of length $t_c$, considering all the sub-bands (historical rate or throughput) and assuming the available frequency band B is divided into S sub-bands, the total number of users willing to communicate is K, the number of users on sub-band s is N (in OMA N=1, in NOMA N>1), and the total power budget is $P_{max}$. At the beginning of the scheduling process, all the users have throughput equal to 0, and at the beginning of each scheduling time slot t, each user k provides the base station with its channel gain on each sub-band s, with s=1 . . . S, $h_{s,k}(t)$, and the average throughput Tk(t) of user k is computer for a past window of length $t_c$, considering all the sub-bands (historical rate or throughput).

The PF scheduler targets long-term fairness. Since the PF scheduler gives each user a priority inversely proportional to its average throughput, it happens that some users do not gain access to available resources whenever their historical rate is high. In such a case, the users will not be assigned any transmission rate for multiple scheduling slots. This behaviour can be very problematic in applications with constraints on user throughput (e. g. quasi-constant data rate applications), or where deep buffering may be needed, and may not be compatible with applications requiring low latency transmission. Moreover, for NOMA schemes, the PF scheduler does not take account of a NOMA specificity: the overall throughput achieved in NOMA systems increases with the difference in channel gains of paired users.

In general, when using PF scheduling for user allocation in NOMA schemes, a large user throughput gain can be observed for users located near the base station compared to orthogonal multiple access (OMA) schemes, but almost no gain is achieved for cell edge users.

It is thus desirable to identify a mechanism for resolving these issues and in particular providing a method for a better attribution of users.

SUMMARY OF THE INVENTION

In accordance with the present invention in a first aspect there is provided a system for attributing users to one or more of a plurality of sub-bands in a multiple access communications system. The system comprises an assignment processor adapted to assign as an initial sub-band assignment a user excluding any user who has already been assigned to an initial sub-band to a respective selected sub-band in a time slot t, as first user for that respective selected sub-band. The system further comprises a power calculator adapted to determine for the respective selected sub-band a plurality of candidate pairs of users for possible assignment to the selected sub-band, each candidate pair of users comprising two different users including the first user and a candidate second user, and to provisionally assign a power allocation to the selected sub-band for each candidate pair of users. The assignment processor is further adapted to restrict the plurality of candidate pairs to a set of candidate pairs comprising candidate second users whose channel gain is complementary to the channel gain of the first user, and to assign the respective second sub-band user as an initial sub-band assignment to the user excluding any user who has already been assigned to an initial sub-band, belonging to the set maximizing a performance metric reflecting the achieved throughput, and/or fairness across users. The system is further advantageously adapted to iteratively process users for each sub-band, until all sub-bands in the current time slot have been attributed.

In accordance with the present invention in a second aspect there is provided a method for attributing users to one or more of a plurality of sub-bands in a multiple access communications system, the method comprising the steps of:

assigning as an initial sub-band assignment a user excluding any user who has already been assigned to an initial sub-band to a respective selected sub-band in a time slot t, as first user for that respective selected sub-band, determining for the respective selected sub-band a plurality of candidate pairs of users for possible assignment to the selected sub-band, each candidate pair of users comprising two different users including the first user and a candidate second user, provisionally assigning a power allocation to the selected sub-band for each candidate pair of users, restricting the plurality of candidate pairs to a set of candidate pairs comprising candidate second users whose channel gain is complementary to the channel gain of the first user, and assigning the respective second sub-band user as an initial sub-band assignment to the user excluding any user who has already been assigned to an initial sub-band, belonging to the set maximizing a performance metric reflecting the achieved throughput, and/or fairness across users, and the method comprising the further steps of then repeating the steps of assigning a first user to the selected sub-band, provisionally assigning a power allocation to the selected sub-band, assigning a second user to the selected sub-band, until all sub-bands in the current time slot have been attributed.

According to a development of the second aspect, the selected sub-band to which the user is assigned as first user as an initial sub-band assignment, is selected as the sub-band to which no first user is currently attributed offering the highest channel gain for that user.

According to a development of the second aspect, a complementary channel gain is a channel gain such that assigning a user having that channel gain to the selected sub-band together with the corresponding first user would indicate a total sub-band throughput greater than the sub-band throughput achievable by assigning all available power as indicated by the provisional power allocation for the corresponding candidate pair of users for the respective sub-band to the first user.

According to a development of the second aspect, the set of candidate pairs is defined by considering each user excluding the user assigned as the first user in order of the respective channel gain values of each user for the selected sub-band, starting with the user having the highest channel gain.

in a case where assignment of that user as a second user to the selected sub-band together with the corresponding first user would indicate a total sub-band throughput greater than the sub-band throughput achievable by assigning all available power for the respective sub-band to the first user alone, the user is incorporated in the set and proceeding to the next user, in order of respective channel gain values, in a case where assignment of that user as a second user to the selected sub-band together with the corresponding first user would not indicate a total sub-band throughput greater than the sub-band throughput achievable by assigning all available power for the respective sub-band to the first user alone, each user excluding the user assigned as the first user is considered in order of the respective channel gain values of each user for the selected sub-band, starting with the user having the lowest channel gain, in a case where assignment of that user as a second user to the selected sub-band together with the corresponding first user would indicate a total sub-band throughput greater than the sub-band throughput achievable by assigning all available power for the respective sub-band to the first user alone, the user is incorporated in the set and the method proceeds to consider the next user in order of respective channel gain values, and in a case where assignment of that user as a second user to the selected sub-band together with the corresponding first user would not indicate a total sub-band throughput greater than the sub-band throughput achievable by assigning all available power for the respective sub-band to the first user alone, the set is considered to be completely defined and the method proceeds to the step of assigning the respective second sub-band user for the selected sub-band.

According to a development of the second aspect, in a case where the set is empty, no second user is assigned to the sub-band corresponding to the empty set, and user assignment for the selected sub-band is considered to be complete on the basis of the assignment of the first user alone.

According to a development of the second aspect, once user assignment is considered to be complete for all sub-bands for the current time slot, in a case where some users have not yet been assigned to any sub-band as an initial time slot assignment, the method comprises continuing to repeat the steps of:

assigning as an initial sub-band assignment a first user to the selected sub-band, provisionally assigning a power allocation to the selected sub-band, assigning a second user as an initial sub-band assignment to the selected sub-band, and selecting a new sub-band for successive time slots until all users have been assigned to a sub-band in the current time slot.

According to a development of the second aspect, once all users have been assigned to a sub-band as an initial sub-band assignment, the method comprises the further steps of assigning to any remaining sub-bands in the current time slot, and each sub-band in subsequent time slots, as a first user, the user having the lowest total achieved throughput, wherein each user is assigned to the remaining sub-band to which no first user is currently attributed offering the highest channel gain for that user.

According to a development of the second aspect, the method comprises the further steps of, once all users have been assigned to an initial sub-band, performing the further step of assigning to any remaining sub-bands in the current time slot and each sub-band in subsequent time slots as a first user U, this user U being the user whose achieved total throughput is furthest from a respective target throughput defined for that user U, wherein each user is assigned to the remaining sub-band to which no first user is currently attributed offering the highest channel gain for that user U.

According to a development of the second aspect, the method may comprise the further step of sorting all users in order of priority according to a criterion prior to the step of assigning, such as channel gain, distance between the user and base station, or the user's throughput and wherein at the step of assigning the user assigned is the user having the highest priority excluding any user who has already been assigned to an initial sub-band to a selected sub-band in a time slot t.

According to a development of the second aspect the step of sorting all users in order of priority comprises a random sorting.

According to a development of the second aspect, the step of sorting all users in order of priority, comprises sorting the users in order of best channel gain measured for the current time slot for each user across all sub-bands, where the user accorded the highest priority is the user having the lowest best channel gain.

According to a development of the second aspect the second sub band user is selected as the candidate second user maximizing a metric reflecting the system throughput, subject to a factor reflecting fairness across users.

According to a development of the second aspect the second sub band user is selected as the candidate second user maximizing a metric reflecting the total throughput achievable by each pair of users comprising the first user assigned to the sub band under consideration and a respective candidate second user, as a proportion of the average throughput achieved by that same pair of users over a predetermined preceding period.

According to a development of the second aspect, the second sub band user is selected as the candidate second user maximizing a metric reflecting the total throughput achievable by each pair of users comprising the first user assigned to the sub band under consideration and a respective candidate second user, as a proportion of the sum of deviations of the throughput of each user over a predetermined preceding period from the average throughput of all users over the predetermined preceding period.

According to a development of the second aspect the second sub band user is selected as the candidate second user maximizing the matching between the average throughput of each user and the average throughput of all users over a predetermined preceding period.

According to a development of the second aspect the method may comprise an additional step of assigning a final power allocation to each user of each sub-band.

According to a development of the second aspect the method may comprise further steps of computing a final real throughput value for each sub-band on the basis of the respective first and second user and the final power allocation, and comparing this final real throughput with the throughput achievable by each respective user alone on each respective sub-band, and in a case where a respective final real throughput is less than the throughput achievable by the respective user alone on any respective sub-band, revoking the second user assigned to that respective sub-band and allocating all power available for that sub-band to the respective first user.

According to a development of the second aspect the step of assigning a provisional power allocation and the step of assigning a final power allocation comprises the steps of:

determining a sub-band attenuation value proportional to the reciprocal of the square of the channel gain value of the users attributed to the selected sub-band and every sub-band to which users have been attributed for the current time slot, applying a water filling algorithm across the selected sub-band and every sub-band to which users have been attributed for the current time slot using a floor for each sub-band defined by the respective sub-band attenuation value, and, calculating a provisional power allocation from the water filling algorithm for the selected sub-band.

According to a development of the second aspect, the step of provisionally assigning a power allocation to each sub-band comprises, for each sub-band for which the second respective user is to be assigned, calculating a provisional inter sub-band power allocation across all sub-bands for which assignment for the selected sub-band is considered to be complete plus the sub-band for which the second respective user is to be assigned by assuming a pro rata distribution of the total available power across all, and performing a waterfilling distribution of that provisional inter sub-band power allocation amongst the sub-bands for which assignment for the selected sub-band is considered to be complete plus the sub-band for which the second respective user is to be assigned on the basis of a waterfilling algorithm based on the channel gain of the users assigned to each sub-band.

According to the invention in a third aspect, there is provided a computer program comprising instructions which, when the program is executed by a computer, cause the computer to carry out one of the method of the second aspect.

BRIEF DESCRIPTION OF THE DRAWINGS

The above and other advantages of the present invention will now be described with reference to the accompanying drawings, for illustration purposes only, in which.

DETAILED DESCRIPTION

Figure 1:
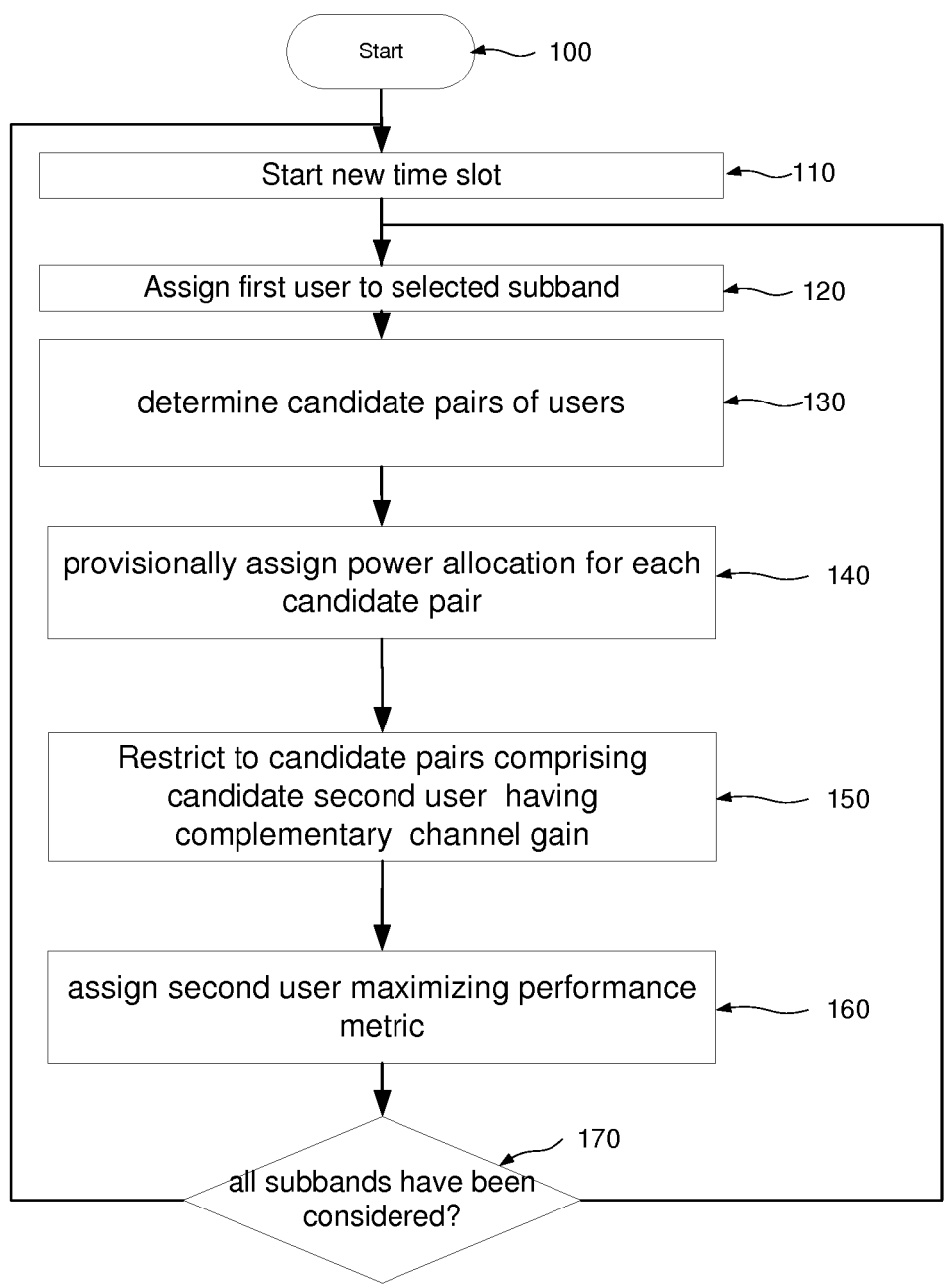
FIG. 1 shows a method attributing users to one or more of a plurality of sub-bands in a multiple access communications system in accordance with an embodiment.

FIG. 1 shows a method attributing users to one or more of a plurality of sub-bands in a multiple access communications system in accordance with an embodiment. Specifically there is provided a method of selecting users from a pool of candidate users U for allocation to a plurality of sub-bands in a time slot t in a multiple access communications system. While the following examples focus on implementations in a NOMA system, it will be appreciated that other systems may be envisaged in which the described approach is applicable.

As shown in FIG. 1, the method starts at step 100 before proceeding to step 110 at which a new time slot begins. Access is granted following allocation of resources in time and frequency. Allocation is divided into a number of time slots. The time slot is the elementary time allocation unit in the communication system. For instance, in LTE systems, it is equal to 1 ms. For each time slot, sub-bands are allocated sequentially until the total number of sub-bands per time slot is reached.

This embodiment relates to an initial sub-band assignment for each user. Subsequent sub-band assignments may occur once all users have received an initial assignment in accordance with this embodiment as described with reference to certain further embodiments below. Exemplary details of this approach are presented in more detail below.

As shown, the method next proceeds to step 120 at which a user is assigned as an initial sub-band assignment to a respective selected sub-band in the current time slot t, as first user for that respective selected sub-band. The user assigned at this step may be any user excluding users who have already been assigned to an initial sub-band.

The user to be assigned at this step may be selected a variety of bases. In certain embodiments, the method may comprise a further step of sorting all users in order of priority according to a criterion such as channel gain, distance between the user and base station, or the user's throughput prior to the step of assigning. On this basis, at step 120, the user assigned may be the user having the highest priority excluding any user who has already been assigned to an initial sub-band to a selected sub-band in a time slot t. In 3G and 4G systems, a parameter is generally fed back from the receiver to the transmitter with information regarding the quality of the channel. This can be treated in accordance with some embodiments of the present invention as an indicator of the channel gain value, and it is presumed that implementations of NOMA in accordance with the present invention will provide some analogous mechanism. As such, in any embodiment, whilst waterfilling is performed based on the channel gain of the users, this need not depend on an explicit measurement of each user's channel gain, but may also use any value that may be obtained or derived in the system which may be taken as indicative of a respective user's channel gain.

As such, a priority list may be used at the beginning of the allocation process for the selection of the $1^{st}$ user on each sub-band. The idea behind this priority list is to have all users granted a sub-band (and some throughput) at least once at the beginning of the allocation process. At the $1^{st}$ time slot, the priority list may be created: all the K users are sorted in the Base Station (BS). The users are removed from this priority list as soon as they are selected in step 120 (or step 160 as described below). At subsequent time slots, if the list is not empty, only the remaining users are sorted again (update of the priority list). The resulting priority list is used while at least one user has not been assigned any sub-band during the assignment process. In certain embodiments, this sorting of users in order of priority may comprise sorting the users in order of best channel gain measured for the current time slot for each user across all sub-bands, where the user accorded the highest priority is the user having the lowest best channel gain.

The lowest best channel gain ("lowest best h") sorting provides good performance (in terms of cell-edge user throughput and total cell throughput)—Users may be sorted at the Base Station based on the channel gain experience by users on available sub-bands, $h_{s,k}$ being the channel gain of user k on sub-band s. This may be expressed in the following manner: for each user k, select that user's highest channel gain $h_{s_{best}}$ among the channel gains experienced over all sub-bands. The user with the highest priority is the one having the lowest best channel gain, and vice versa.

In certain embodiments, the user may be selected at random. This may comprise the further step of sorting all users in order of priority according to a random sorting, which may be performed at a lower processing overhead that other sorting approaches.

Sub-Band Assignment

User 1 ($k_1$) is assigned the sub-band which has the highest value of $h_{s,k1}$ among all the available sub-bands.

In embodiments assigning users from a priority list, at this stage if the priority list is not empty, the assigned user $k_1$ may be removed from the list. Accordingly, the selected sub-band to which the user is assigned as first user at step 120 may be selected as the sub-band to which no first user is currently attributed offering the highest channel gain for that user. Alternatively, the sub-band to which the user is assigned may be selected at random from the sub-bands to which no first user is currently assigned. This may comprise the further step of sorting all users in order of priority according to a random sorting, which may be performed at a lower processing overhead that other sorting approaches.

For the purposes of this description, achieved throughput equals the average throughput achieved by the user over a predefined historical period, and projected throughput is, for the current time slot, the sum of the achievable throughputs for the user on each sub-band to which the user has been attributed. The achieved throughput can include the projected throughput or not.

On the basis of these embodiments using a priority list, and considering that when a user is assigned to a sub-band (either as first or second user) that user is removed from the list, the selection of the first user in the initial sub-band assignment phase as discussed above may be described in terms of the priority list not being empty (i.e. all the users have not been assigned a sub-band, or, equivalently, any throughput, yet) in which case the selection of the next user to be assigned to a sub-band as user 1 may be carried out according to the order given by the priority list. Similarly, when the priority list is empty (all the users have now been assigned a sub-band or equivalently, a non-zero throughput) alternative selection mechanisms may be envisaged as described below.

The method next proceeds from step 120 to step 130 at which a plurality of candidate pairs of users are determined for possible assignment to the selected sub-band, where each candidate pair of users comprises two different users including the first user (as assigned to the sub-band at step 120) and a candidate second user.

At step 140, a provisional power allocation is assigned to the selected sub-band for each candidate pair of users.

Power may be distributed equally amongst sub-bands, although there are many alternative approaches of allocation of power to sub-bands (such as waterfilling), and amongst users (for example FPA—Fixed power allocation, FTPA—fractional transmit power allocation or Full Search Power Allocation) within a sub-band, all of which are compatible with and encompassed in the present disclosure.

In order to further improve the achieved system performance in NOMA, the problem of optimally distributing users among sub-bands should be addressed. This may lead to improved user fairness and/or increase the achieved system throughput.

The achievable throughputs for users $k_1$ and $k_2$ are functions of the power allocated to each user as defined in equation 1 above.

Several strategies can be applied to the distribution of a sub-band's available power between the users attributed to that sub-band, such as:

Intrasub-band PA: Fixed Power Allocation (FPA)
  Fractional Transmit Power Allocation (FTPA)
  Full Search Power Allocation (FSPA)

Similarly, the total available transmission power may be distributed between sub-bands by a variety of mechanisms. One example is based on an equal distribution of power. Alternatively, according to certain alternative embodiments, provisional PA may be carried out during the pairing process. This provides an opportunity to attempt to identify an optimal power distribution between the users.

In certain embodiments, a provisional iterative waterfilling method may be applied to obtain the provisional distribution to be computed using the same iterative waterfilling method, with the total power amount Pmax to be distributed among all the S sub-bands.

Conventional waterfilling requires an overall optimization over all the users and all the sub-bands, and is therefore not compatible with the sequential approach of the present invention.

Using a specific formulation, waterfilling can be applied in a sequential fashion: users are selected sequentially, but final power allocation is only performed at the end of the process, once all the users have been chosen. The throughputs can only be computed at the end of the user selections process.

A variant of this waterfilling process can be applied with the assumption that the power assigned to the s first sub-bands ($1 \leq s \leq S$) is equal to s×Pmax/S where the $s^{th}$ sub-band is the sub-band selected for consideration, S is the total number of available sub-bands and Pmax is the total power amount to be distributed among all the S sub-bands.

On this basis, Pmax/S is assigned to a first sub-band and no further inter-sub-band calculation is required for this sub-band. In successive iterations, the inter-sub-band power allocation for the $s^{th}$ sub-band assigned in the time slot (s>1) s×Pmax/S is provisionally assigned across the s first sub-bands. In these later iterations, where there are more than one sub-bands to consider, this power is redistributed among all the s sub-bands using the iterative waterfilling procedure as described in more detail below.

Initially, a sub-band attenuation value for candidate set of users is obtained, proportional to the reciprocal of the square of gain of the selected channel, corresponding for each combination to the highest of the channel gain value associated with the users in that candidate set.

Optionally, the sub-band attenuation value may be equal to the total transmission bandwidth multiplied by the Noise power, divided by the square of the selected channel gain value multiplied by the total number of the sub-bands, or $$\frac{BN_0}{S\, h_{s,k^*}^2},$$

where $N_0$ is the noise power (equal for all sub-bands) and $h_{s,k^*}^2$ is the channel gain of the user k* showing the highest channel gain in a given combination of users on the sub-band currently under consideration, s designates a particular sub-band under consideration, and S is the total number of sub-bands.

The provisional power assignment may then be calculated for the sub-band under consideration. This is calculated using a water filling algorithm across the selected sub-band and every sub-band selected previously, using a floor for each sub-band defined by the respective sub-band attenuation value.

A waterfilling algorithm may be seen as implicitly ensuring that the total power assigned across the carrier under consideration and all other sub-bands to which users have been assigned, is equal to a pro-rata proportion of the total power budget, assuming an equal share of power for each sub-band for the total power budget equal to s×Pmax/S as discussed above, and such that for each sub-band considered thus far the sum of the power provisionally assigned to that sub-band and the sub-band attenuation value of that sub-band is a constant.

Specifically, the waterline level is predicted based on the previous level (as determined for the sub-bands allocated so far) and the channel gain of the considered users scheduled on the current sub-band s.

Maximizing the achieved throughput through an optimal sharing a pro-rata proportion of the total transmit power s×Pmax/S among s sub-bands may then be achieved if:

$$P_j + \frac{N_0 B/S}{h_{j,k_j^*}^2} = W_s, \quad j = 1 \ldots s \quad (6)$$

where $P_j$ denotes the amount of power allocated to sub-band j, $W_s$ is the waterline at allocation stage s, and $h_{j,k_j^*}^2$ the channel gain of user $k_j^*$ showing the highest channel gain among scheduled users on sub-band j.

During the allocation process, a pro-rata proportion of the total transmit power s×Pmax/S is distributed, at each allocation stage i, among allocated sub-bands based on (5), resulting in:

$$\frac{sP_{max}}{S} = \sum_{j=1}^{s}\left(W_s - \frac{N_0 B/S}{h_{j,k_j^*}^2}\right) \quad (7)$$

which can be re-written as:

$$\frac{sP_{max}}{S} = sW_s - \sum_{j=1}^{s}\left(\frac{N_0 B/S}{h_{j,k_j^*}^2}\right) \quad (8)$$

When allocating power to the next sub-band, denoted by s+1, since a proportional amount of total power is redistributed by the scheduler, the waterline is updated only if $$\frac{N_0 B/S}{h_{s+1,k_{s+1}^*}^2} < W_{s+1},$$

otherwise it will keep its old value and $w_{s+1}=w_s$. When the waterline is updated, a pro rata proportion of the total transmit power (s+1)Pmax/S is distributed at stage s+1 as follows:

$$\frac{(s+1)P_{max}}{S} = \sum_{j=1}^{s+1}\left(W_{s+1} - \frac{N_0 B/S}{h_{j,k_j^*}^2}\right) \quad (9)$$

Hence, using equation (7) and equation (8), the following equality holds:

$$sW_s - \sum_{j=1}^{s}\left(\frac{N_0 B}{S}\right) + \frac{P_{max}}{S} = (s+1)W_{s+1} - \sum_{j=1}^{s}\left(\frac{N_0 B/S}{h_{j,k_j^*}^2}\right) - \frac{N_0 B/S}{h_{s+1,k_{s+1}^*}^2} \quad (10)$$

Then, the waterline at stage s+1 can be formulated as:

$$W_{s+1} = \left(sW_s + \frac{P_{max}}{S} + \frac{N_0 B/S}{h_{s+1,k_{s+1}^*}^2}\right)/(s+1)$$

Therefore, at each $s^{th}$ step of the scheduling process, for every candidate user set U, the waterline level is derived from $$W_{s,U} = \left((s-1)W_{s-1,U} + \frac{P_{max}}{S} + \frac{N_0 B/S}{h_{s,k_{s,U}^*}^2}\right)/s \quad (11)$$

where $k_{s,U}^*$ is the user showing the highest channel gain among scheduled users in the set U, over sub-band s. Once the waterline level at the actual stages is determined, power may then be provisionally assigned for each candidate set U as $P_{s,U}$ using:

$$P_{s,U} = W_{s,U} - \frac{N_0 B/S}{h_{s,k_{s,U}^*}^2} \quad (12)$$

Figure 2:
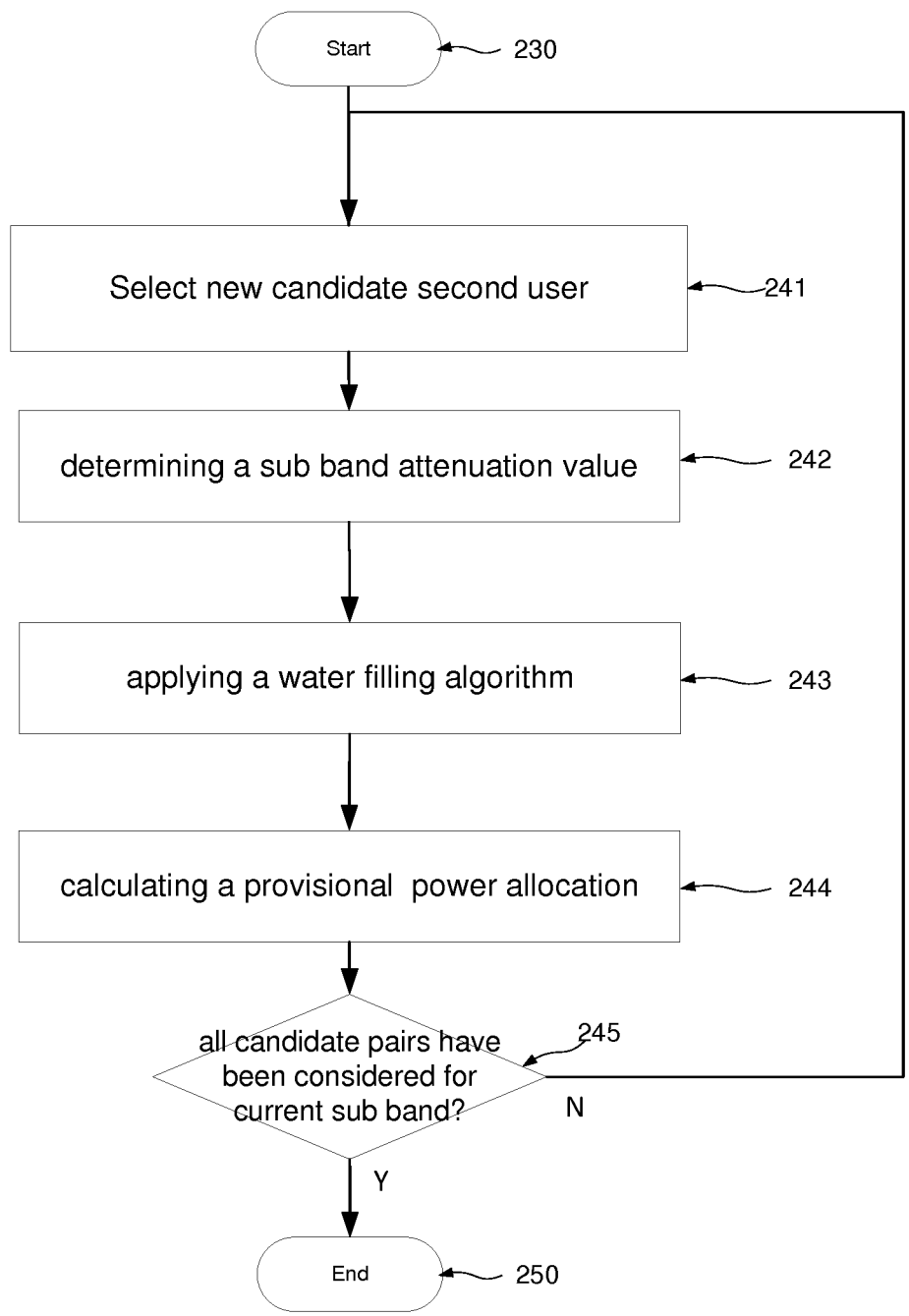
FIG. 2 shows details of a method of determining provisional power allocations in accordance with an embodiment.

FIG. 2 illustrates details of a method of determining provisional power allocations in accordance with an embodiment. FIG. 2 shows in more detail a possible implementation of step 140. As shown, the method starts at step 230 before proceeding to step 241, at which a new second candidate user is selected. The method then proceeds to step 242 at which a sub-band attenuation value proportional to the reciprocal of the square of the channel gain value is determined for each candidate pair of users for the selected sub-band, and every sub-band to which users have been attributed for the current time slot. The sub-band attenuation value may already have been determined for the first user, and will be available from previous iterations for the sub-bands to which user pairs have already been assigned, so that determining these values may comprise retrieving them from memory. The method next proceeds to step 243 at which a water filling algorithm is applied across the selected sub-band and every sub-band to which users have been attributed for the current time slot using a floor for each sub-band defined by the respective sub-band attenuation value. The method then proceeds to step 244 at which a provisional power allocation is calculated from the water filling algorithm for the selected sub-band assuming a pro rata distribution of the total available power across all sub-bands, and performing a waterfilling distribution of that provisional inter sub-band power allocation amongst the sub-bands for which assignment for the selected sub-band is considered to be complete plus the sub-band for which the second respective user is to be assigned. The method then proceeds to step 245 at which it is determined whether power allocations have been obtained for the current sub-band for all candidate user pairs, and in a case where user pairs remain, reverting to step 241, or otherwise terminating at step 250.

Figure 3:
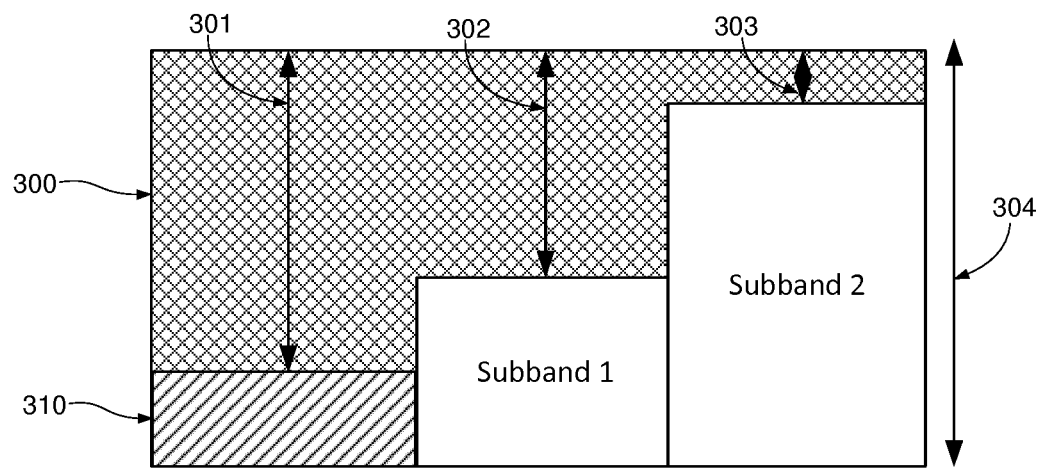
FIG. 3 demonstrates the application of the water filling algorithm for a first user combination scenario.

FIG. 3 demonstrates the application of the water filling for a first user combination scenario.

As shown in FIG. 3, a calculation is carried out on the basis of a first one of the sub-band attenuation values calculated at step 120.

As shown in FIG. 3, the sub-band attenuation value of each of the sub-bands (the current sub-band, and the two preceding sub-bands) are illustrated arranged next to each other in order of magnitude, with the sub-band having the lowest sub-band attenuation value on the left, and the sub-band having the highest sub-band attenuation value on the right.

As such, in FIG. 3, the current sub-band with first sub-band attenuation value 310 is situated on the left of the other sub-bands. In accordance with the equations 10 and 11 above, the pro rata proportion of the total power budget can be provisionally distributed amongst the sub-bands such that the power assigned to the carrier under consideration and all other sub-bands to which users have been assigned is equal to the pro rata proportion of the total power budget, and such that, for each sub-band, the sum of the power provisionally assigned to that sub-band and the sub-band attenuation value of that sub-band is a constant. It will be appreciated that while the water filling algorithm implies distribution of power in the manner described with respect to FIG. 3, the equations mentioned above need not be explicitly resolved, in order to provide a power value for the sub-band under consideration 310 to become available.

Thus, as shown, a first provisional power allocation 301 is made to the sub-band currently under consideration, a second provisional power allocation 302 is implied for sub-band 1, and a third provisional power allocation 303 is implied for the sub-band 2, such that in each case the sum of each provisional power allocation with the corresponding sub-band attenuation value would be equal to a constant value 304, and the sum of the three values 301, 302, 303 is equal to the pro rata proportion of the transmission power budget. It will be appreciated the implicit power allocations for the sub-bands not under consideration are not in fact retained for those other sub-bands. In particular, user allocation for those sub bands may be performed on the basis of the provisional power allocations performed for those sub bands when there were under consideration, and where appropriate a new definitive power allocation may be performed once all user assignment is complete.

This approach is analogous to filling a vessel with an uneven floor (as dictated by the different sub-band attenuation values) with water. Given a particular volume of water, corresponding to the total transmission power budget, it will naturally find its own level, whereby the depth at any point indicates the power allocation for the underlying sub-band.

This represents a rational mechanism for power distribution, since it makes sense to invest the most power in the sub-band with the highest channel gain, and thus the lowest sub-band attenuation value, since allocating on this basis ensures the highest possible total throughput rates.

The step of assigning a provisional power allocation may comprise the steps of for each sub-band for which the second respective user is to be assigned, calculating a provisional inter sub-band power allocation across all sub-bands for which assignment for the selected sub-band is considered to be complete plus the sub-band for which the second respective user is to be assigned. This provisional inter sub-band power allocation may be obtained by assuming a pro rata distribution of the total available power across all sub-bands, and performing a waterfilling distribution of that provisional inter sub-band power allocation amongst the sub-bands for which assignment for the selected sub-band is considered to be complete plus the sub-band for which the second respective user is to be assigned on the basis of a waterfilling algorithm based on the channel gain of the users assigned to each sub-band.

At step 150, the plurality of candidates is restricted to a set of candidate pairs comprising candidate second users whose channel gain is complementary to the channel gain of the first user.

A complementary channel gain is a channel gain, such that assigning a user having that channel gain to the selected sub-band together with the corresponding first user, would indicate a total sub-band throughput greater than the sub-band throughput achievable by assigning all available power as indicated by the provisional power allocation for the corresponding candidate pair of users for the respective sub-band to the first user.

In certain embodiments, a complementary second user may be a candidate second user which exhibits a large difference in channel gain with respect to the first user $k_1$, taking advantage of the fact that the total throughput in NOMA systems increases with the difference in channel gains of paired users. In certain embodiments, a complementary second user may be a candidate second user whose channel gain differs from that of the first user $k_1$, taking advantage of the fact that the total throughput in NOMA systems increases with the difference in channel gains of paired users.

Different mechanisms for identifying such complementary users may be envisaged. In a first, "brute force" implementation, the channel gain values may be computed for all the users $k_2$ (excluding the already selected first user $k_1$) for the sub-band s for which the second respective user is to be assigned, and for every candidate second user $k_2$, computing the achievable throughput for $k_1$ and $k_2$ on s.

It will be appreciated that the achievable throughput for $k_1$ and $k_2$ depends on the intra-sub-band and inter sub-band power allocation strategy.

On this basis, only the subset $S_2$ of users $k_2$ need be retained such that the cumulated achievable throughput of $k_1$ and $k_2$ on sub-band s is greater than the throughput of $k_1$ alone (that is, the OMA situation). If no user $k_2$ can satisfy this condition ($S_2=\emptyset$), the method may simply adopt OMA, where user $k_1$ occupies the currently selected sub-band s.

Other approaches besides the forgoing brute force approach are possible.

Figure 4:
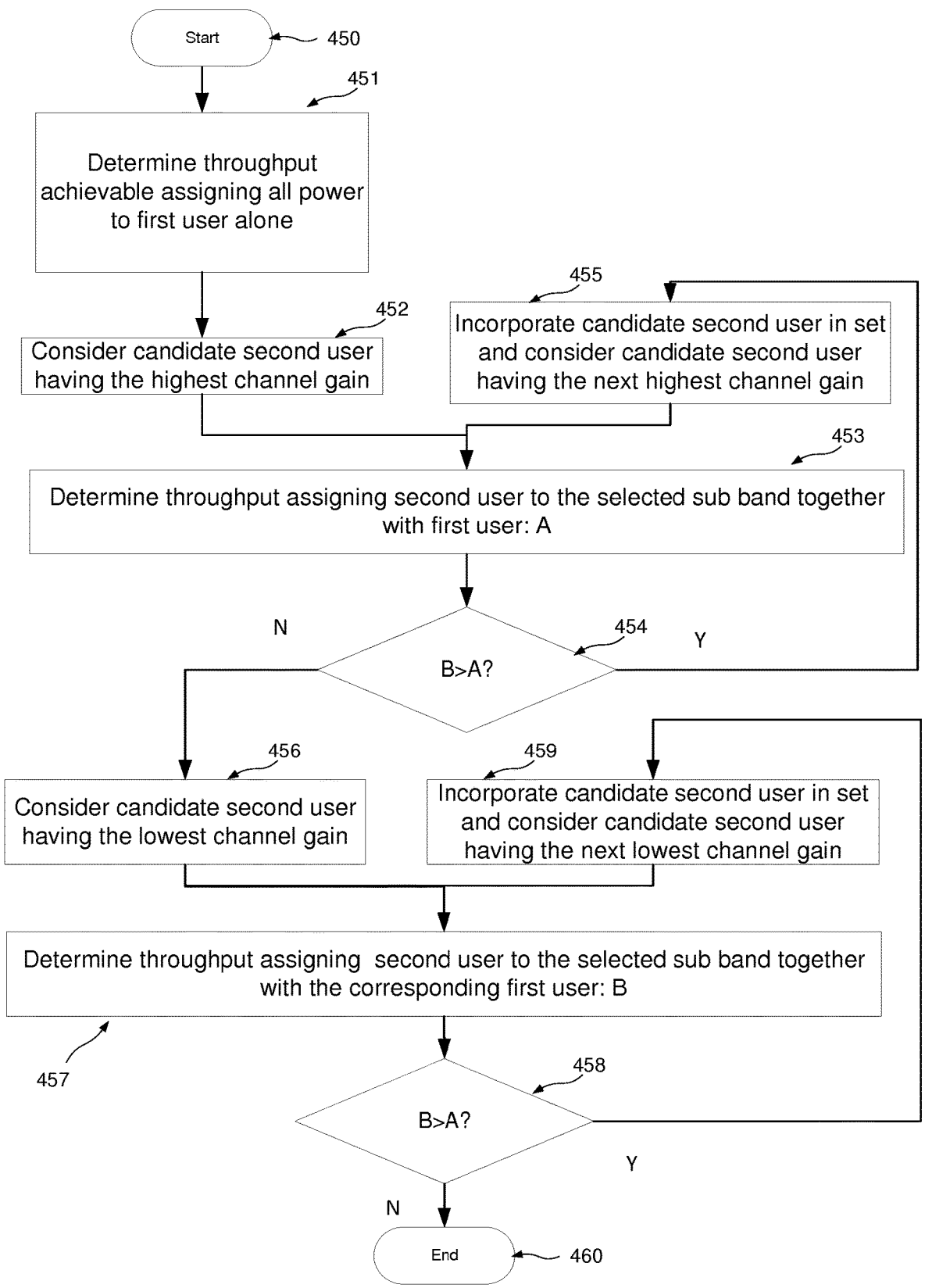
FIG. 4 shows the steps of an exemplary optimized mechanism for obtaining a set of candidate pairs comprising candidate second users whose channel gain is complementary to the channel gain of the first user.

FIG. 4 shows the steps of an exemplary optimized mechanism for obtaining a set of candidate pairs comprising candidate second users whose channel gain is complementary to the channel gain of the first user.

As shown in FIG. 4 there is provided a specific and simplified implementation which does not need the computation of throughput values for all users.

Specifically, the method starts at step 450 before proceeding to step 451 at which the sub-band throughput achievable by assigning all available power for the respective sub-band to the first user alone is calculated (the OMA scenario). In FIG. 4 this throughput value is designated A. The method next proceeds to step 452 at which the candidate second user with the highest channel gain is selected for consideration, before moving on to steps 453 at which the sub-band throughput achievable by assigning the available power for the respective sub-band to the first user together with the selected candidate second user is calculated. In FIG. 4 this throughput value is designated B. At step 454 it is determined whether or not the assignment of the candidate second user as a second user to the selected sub-band together with the corresponding first user would indicate a total sub-band throughput greater than the sub-band throughput achievable by assigning all available power for the respective sub-band to the first user alone, that is to say, whether B is greater than A. In a case where B is greater than A, the method proceeds to step 455 at which the candidate second user is incorporated in the set of candidate pairs, and then selecting the next user in order of respective channel gain values (i.e., the user having the next highest channel gain) and looping back to step 453.

In a case where it is determined at step 454 that assignment of the user as a second user to the selected sub-band together with the corresponding first user would not indicate a total sub-band throughput greater than the sub-band throughput achievable by assigning all available power for the respective sub-band to the first user alone (B=<A), the method proceeds to step 456. This represents the inference that if a particular candidate user cannot provide an improvement in throughput, successive candidate second users with lower channel gains will be increasingly close to the channel gain of the first user, and as such necessarily offer still lower total throughputs. On this basis, the subsequent candidate second users can be disregarded without specific treatment.

It will be appreciated that the steps 452 to 455 start from the assumption that the channel gain of the first user is low, so that complementary second users will have high channel gains. The opposite scenario may also be possible, where the first user has a high channel gain, so that the complementary second user will have a low channel gain. The following steps apply a corresponding logic to this scenario.

At step 456, the candidate second user having the lowest channel gain is selected. The method then proceeds to step 457 at which the sub-band throughput achievable by assigning the selected candidate second user to the selected sub-band together with the corresponding first user is determined. In FIG. 4 this throughput value is designated B. At step 458 it is determined whether or not the assignment of the candidate second user as a second user to the selected sub-band together with the corresponding first user would indicate a total sub-band throughput greater than the sub-band throughput achievable by assigning all available power for the respective sub-band to the first user alone, that is to say, whether B is greater than A. In a case where B is greater than A, the method proceeds to step 459 at which the candidate second user is incorporated in the set of candidate pairs, and then the next user selected in order of respective channel gain values (i.e., the user having the next lowest channel gain) and looping back to step 457.

In a case where it is determined at step 458 that assignment of the user as a second user to the selected sub-band together with the corresponding first user would not indicate a total sub-band throughput greater than the sub-band throughput achievable by assigning all available power for the respective sub-band to the first user alone (B=<A), the method terminates at step 460. This represents the inference that if a particular candidate user cannot provide an improvement in throughput, successive candidate second users with higher channel gains will be increasingly close to the channel gain of the first user, and as such necessarily offer still lower total throughputs. On this basis, the subsequent candidate second users can be disregarded without specific treatment.

Accordingly, the steps of FIG. 4 constitute considering each user excluding the user assigned as the first user in order of the respective channel gain values of each user for the selected sub-band, starting with the user having the highest channel gain. On this basis, In a case where assignment of that user as a second user to the selected sub-band together with the corresponding first user would indicate a total sub-band throughput greater than the sub-band throughput achievable by assigning all available power for the respective sub-band to the first user alone, the user is incorporated in the set and the next user in order of respective channel gain values in considered.

In a case where assignment of that user as a second user to the selected sub-band together with the corresponding first user would not indicate a total sub-band throughput greater than the sub-band throughput achievable by assigning all available power for the respective sub-band to the first user alone, each user excluding the user assigned as the first user is considered in order of the respective channel gain values of each user for the selected sub-band. This process may start with the user having the lowest channel gain.

in a case where assignment of that user as a second user to the selected sub-band together with the corresponding first user would indicate a total sub-band throughput greater than the sub-band throughput achievable by assigning all available power for the respective sub-band to the first user alone, the method may incorporate the user in the set. The method may then proceed to the next user in order of respective channel gain values.

in a case where assignment of that user as a second user to the selected sub-band together with the corresponding first user would not indicate a total sub-band throughput greater than the sub-band throughput achievable by assigning all available power for the respective sub-band to the first user alone, the method may consider the set to be completely defined and proceed to the step of assigning the respective second sub-band user for the selected sub-band.

It will be appreciated that this may be achieved via a range of different logical flows of equivalent effect. For example, the method might start by working up from the candidate second user with the lowest channel gain before considering candidate second users with high channel gains, or the two approaches may be performed independently or in parallel. The determination of the sub-band throughput achievable by the first user alone may be performed at any convenient juncture before step 454 at which the value is required.

The method of FIG. 1 next proceeds from step 150 to step 160 at which a respective second sub-band user is assigned (as an initial sub-band assignment) to the user excluding any user who has already been assigned to an initial sub-band, belonging to the set maximizing a performance metric reflecting the achieved throughput, and/or fairness across users.

Now that a set of complementary pairs of candidate users is available, the method of FIG. 1 may proceed to select one of these candidate pairs of users for the definitive attribution of a selected second candidate user to the selected sub band.

At step 160, the second sub band user may be selected as the candidate second user maximizing a metric reflecting the system throughput, subject to a factor reflecting fairness across users.

There exist a variety of metrics suitable for the selection of the second users subject to a factor reflecting fairness across users, examples of which will be presented in the following part of the specification.

A first example of a metric suitable for use at step 160 is termed "Flexible Throughput vs Fairness Maximisation Metric" (FTFMM).

In accordance with the FTFMM metric, a second user $k_2$ is selected that maximizes the metric $$k_2 = \mathrm{Argmax}_{k \in S_2} \frac{R_{s,k}(t) + R_{s,k_1}(t)}{aR_{k,tot}(t) + bR_{k_1,tot}(t)} \quad (13)$$

Where
$R_{s,k}(t)$ (and respectively $R_{s,k_1}(t)$) is the achievable throughput for user k (respectively $k_1$) on sub-band s, when paired with $k_1$ (respectively k).
$R_{k,tot}(t)$ (and respectively $R_{k_1,tot}(t)$) is the historical throughput for user k in a past window of length $t_c$ taking account of the projected throughput of user k at time $t, R_k(t)$ (respectively $t, R_{k_1}(t)$).

$$R_{k,tot}(t) = \left(1 - \frac{1}{t_c}\right)T_k(t) + \frac{R_k(t)}{t_c}$$

Where $T_k(t)$ is the average throughput of user k in the past window of length $t_c$, $R_k(t)$ (projected throughput) is the sum of the achievable throughputs for user k on each sub-band to which user k has been attributed in the current time slot.

The maximization of this metric tends to favour the pair of users with a high NOMA throughput and/or with a low historical throughput.

Thus the numerator portion represents the NOMA throughput on sub-band s with a given pair of users, and the denominator represents a weighted cumulated historical throughput of those same users.

Parameters a and b are optional and may take values between 0 and 1, so as to provide a mechanism for varying the relative importance of fairness on one hand and throughput on the other.

If a=0, the historical throughput of the second candidate user is not accounted for in the metric and the selection of user $k_2$ is only based on the maximisation of the NOMA throughput on the current sub-band (since user $k_1$ is fixed).

If b=0, user $k_2$ is selected by taking the NOMA throughput as well as the historical throughput of user $k_2$ into consideration. The metric ensures balance between fairness for $k_2$ and NOMA throughput on the current sub-band s.

In other cases (0<a, b<1) the historical throughput of user $k_1$ is taken into account in the denominator, reducing the impact of the historical throughput of user $k_2$.

The maximisation of this metric tends to favour the pair of users with a high NOMA throughput, and/or with a low historical throughput and/or with a low throughput loss in NOMA as compared to an OMA configuration with user $k_1$ alone.

User selection on the basis of the foregoing metrics generally comprises identifying the user minimizing or maximizing the metric. It will be appreciated that since the metrics are presented as one factor divided by another, whether the desired user maximizes or minimizes the metric will depend on which factor is adopted as the numerator and which as the denominator. Generally, this may be referred to as identifying the user giving rise to an extremum in the ratio between the two factors.

As such, this is one example of a metric suitable for use in the selection of the second user for a particular sub-band, wherein the second sub band user is selected as the candidate second user giving rise to an extremum in a metric reflecting the ratio between total throughput achievable by each pair of users comprising the first user assigned to the sub band under consideration and a respective candidate second user, and the average throughput achieved by that same pair of users over a predetermined preceding period.

A second example of a metric suitable for use at step 160 is termed "Fairness Maximisation metric" (FMM). In accordance with this metric, the user $k_2$ that minimizes the following metric is selected:

$$k_2 = \mathrm{Argmin}_{k \in S_2} \frac{\sum_{k'=1}^{K} |R_{k',tot}(t) - AVG(t)|}{AVG(t)} \quad (14)$$

$R_{k',tot}$ is the historical throughput of user k' in a past window of length $t_c$, taking account of the projected throughput for user k' at time t, $$R_{k',tot}(t) = \left(1 - \frac{1}{t_c}\right)T_{k'}(t) + \frac{R_{k'}(t)}{t_c} \quad (15)$$

If user k' has not been assigned any sub-band in the current allocation time slot t, $$\frac{R_{k'}(t)}{t_c} = 0$$

$$AVG(t) = \frac{1}{K}\sum_{k'=1}^{K} R_{k',tot}(t)$$

is the average value of $R_{k',tot}(t)$, computed over all the users.

The minimization of this metric tends to favour user $k_2$ that makes the historical throughput of every user as close as possible to the average throughput of all users. Perfect fairness is obtained when the metric is equal to zero.

In equation (13), the candidate second user under consideration k does not explicitly appear in the expressions of the numerator or of the denominator but it actually has an impact on the values of the historical throughput values $R_{k',tot}(t)$ and on AVG(t) via the projected throughputs, $R_k(t)$.

Illustrating Examples:

In case of equal power allocation: only the historical throughput values of the candidate second user under consideration k and of the selected first user $k_1$, $R_{k,tot}(t)$ and $R_{k_1,tot}(t)$, depend on the choice of user k, In case of iterative water filling (as described above): the choice of user k has an impact on $R_{k,tot}(t)$ and $R_{k_1,tot}(t)$ and also on all values of $R_{k',tot}(t)$ for the users K already allocated in current time slot t.

As such, this is one example of a metric suitable for use in the selection of the second user for a particular sub-band, wherein the second sub band user is selected as the candidate second user giving rise to an extremum in the matching between the average throughput of each user and the average throughput of all users over a predetermined preceding period.

A third example of a metric suitable for use at step 160 is a variant of the Flexible Throughput vs Fairness Maximisation Metric, wherein the user $k_2$ that minimizes the following metric is selected:

$$k_2 = \mathrm{Argmin}_{k \in S_2} \frac{\sum_{k'=1}^{K} |R_{k',tot}(t) - AVG(t)|}{R_{s,k}(t) + R_{s,k_1}(t)} \quad (16)$$

The minimization metric tends to favour users $k_2$ that make the historical throughput of every user as close to the average throughput of all users and/or with a high NOMA throughput. As such this metric represents a combination of aspects of the preceding metrics, offering a balance between fairness and throughput.

This metric computation requires Power Allocation, PA (provisional or final, depending on the PA Strategy).

As such, this is one example of a metric suitable for use in the selection of the second user for a particular sub-band, wherein the second sub band user is selected as the candidate second user giving rise to an extremum in a metric reflecting a ratio between the total throughput achievable by each pair of users comprising the first user assigned to the sub band under consideration and a respective candidate second user, and the sum of deviations of the throughput of each user over a predetermined preceding period from the average throughput of all users over the predetermined preceding period.

It has been shown experimentally that implementations performed by the inventors of the method of FIG. 1 adopting the FTFMM metric with the a weighting factor set to 0 and the b weighting factor set to 1 provides a smaller benefit in fairness per additional sub-band than adopting the FTFMM metric with the a weighting factor set to 0.5 and the b weighting factor set to 0.5, which in turn provides a smaller benefit in fairness per additional sub-band than adopting the FTFMM metric with the a weighting factor set to 1 and the b weighting factor set to 0, whilst the FMM metric provides the greatest benefit in fairness per additional sub-band. All implementations provide significant improvements compared to conventional proportional fairness.

It has been shown experimentally that implementations of the method of FIG. 1 adopting the FTFMM metric with the a weighting factor set to 0 and the b weighting factor set to 1 provides a smaller benefit in fairness per additional user per cell than adopting the FTFMM metric with the a weighting factor set to 0.5 and the b weighting factor set to 0.5, which in turn provides a smaller benefit in fairness per additional user per cell than adopting the FTFMM metric with the a weighting factor set to 1 and the b weighting factor set to 0, whilst the FMM metric provides the greatest benefit in fairness per additional user per cell. All implementations provide significant improvements compared to conventional proportional fairness in NOMA, which in turn provides advantages over OMA in the test scenario.

It has been shown experimentally that implementations of the method of FIG. 1 adopting the FTFMM metric with the a weighting factor set to 1 and the b weighting factor set to 0 converge on optimal fairness more quickly than adopting the FTFMM metric with the a weighting factor set to 0.5 and the b weighting factor set to 0.5, which in turn converge on optimal fairness more quickly than adopting the FTFMM metric with the a weighting factor set to 0 and the b weighting factor set to 1, whilst the FMM metric provides the fastest convergence on optimal fairness.

All implementations of the invention provide significant improvements compared to conventional proportional fairness in NOMA (reaching a Gini fairness of 0.1 in less than 10 ms or less) apart from the FTFMM metric with the a weighting factor set to 0 and the b weighting factor set to 1, which shows a relatively small improvement.

The FTFMM metric with the a weighting factor set to 1 and the b weighting factor set to 0, and the FMM metric show a far smoother, less bursty user throughput level over time.

It has been shown experimentally that implementations of the method of FIG. 1 adopting the FTFMM metric with the a weighting factor set to 0 and the b weighting factor set to 1 provides a dramatic improvement (around 40%) in throughput for all numbers of sub-bands, while adopting the FTFMM metric with the a weighting factor set to 0.5 and the b weighting factor set to 0.5, or the a weighting factor set to 1 and the b weighting factor set to 0 offer some improvement (around 10%) whilst the FMM metric provides less important improvements compared to conventional proportional fairness. The same general distributions are the same when considering throughput for different numbers of users, although performance differences are limited with small numbers of users (10 in the experiments), they grow very quickly when adopting the FTFMM metric with the a weighting factor set to 0 and the b weighting factor set to 1 for larger user counts.

Naturally the values obtained in different configurations will vary on the basis of system configuration and other experimental conditions.

Although as discussed above a certain number of exemplary metrics have been presented, it will be appreciated that many variants of these general approaches may be envisaged, any of which may be chosen based on the relevant importance of different operational parameters in a particular implementation.

As shown in FIG. 1 the method next determines at step 170 whether all sub-bands have been considered and in a case where sub-bands remain to be considered, reverting to step 120, or otherwise reverting to step 110. On this basis, the method may be considered to comprise the further steps of then repeating the steps of assigning a first user to a selected sub-band, provisionally assigning a power allocation to the selected sub-band, and assigning a second user to the selected sub-band, until all sub-bands in the current time slot have been attributed.

The method of FIG. 1 of attributing users to one or more of a plurality of sub-bands in a multiple access communications system achieves fairness among users in any time scale of interest and reduces the convergence time towards a required fairness performance, with short-term fairness being achieved, which is particularly beneficial when quasi-constant user rate is required, requires no deep buffering and is compatible with low-latency constraints. Furthermore, it provides higher total cell throughput than the classic PF scheduler. It can be associated with unequal power allocation techniques such as waterfilling. For NOMA schemes, reduction of the number of tested user pairs for each sub-band attribution, leading to a complexity decrease compared to PF.

As mentioned above, the embodiment of FIG. 1 relates to an initial sub-band assignment for each user. Subsequent sub-band assignments occurring once all users have received an initial assignment may then occur according to a further mechanism. This may occur in a context where User 1 is selected among the set of users that need to communicate as the user experiencing the lowest total achieved throughput, or alternatively where user 1 is selected among the set of users that need to communicate as the user experiencing the largest distance between its projected throughput and its target throughput.

In either case, on this basis where, at step 160, the set of assignable users is empty, no second user is assigned to the sub-band corresponding to the empty set, and user assignment for the selected sub-band is considered to be complete on the basis of the assignment of the first user alone.

On this basis, once user assignment is considered to be complete for all sub-bands for the current time slot, in a case where some users have not yet been assigned to any sub-band as an initial time slot assignment, the method may comprise the further steps of continuing to repeat the steps of assigning as an initial sub-band assignment a first user to the selected sub-band, provisionally assigning a power allocation to the selected sub-band, and assigning a second user as an initial sub-band assignment to the selected sub-band, and selecting a new sub-band for successive time slots, until all users have been assigned to a sub-band in the current time slot.

As mentioned above, the embodiment of FIG. 1 relates to an initial sub-band assignment for each user. Subsequent sub-band assignments occurring once all users have received an initial assignment may then occur according to a further mechanism. In particular, once all users have been assigned to a sub-band as an initial sub-band assignment, any remaining sub-bands in the current time slot, and each sub-band in subsequent time slots may be assigned as a first user the user having the lowest total achieved throughput, wherein each user is assigned to the remaining sub-band to which no first user is currently attributed offering the highest channel gain for that user. This approach may be applicable in particular where users are not assigned throughput targets.

Alternatively, once all users have been assigned to an initial sub-band, for any remaining sub-bands in the current time slot and each sub-band in subsequent time slots, a user may be assigned as first user whose achieved total throughput is furthest from a respective target throughput defined for that user, wherein each user is assigned to the remaining sub-band to which no first user is currently attributed offering the highest channel gain for that user. This approach may be applicable in particular where users are assigned throughput targets.

The separate treatment of initial sub band allocation advantageously helps ensure that all users are served quickly, thereby reducing service latency and in a quasi-optimal way. After this initial phase, users may be served according to the system/user requirements for example on a best effort or target throughput basis. The initial phase as described above allows the short-term fairness to be improved and the subsequent phase helps guarantee a high throughput and a good long-term fairness.

The method may comprise an additional step of assigning a final power allocation to each user of each sub-band. This may be performed for example for each sub-band once all user allocations are complete for that sub-band in the current time slot. The final power allocation may be performed by a final iteration of the waterfilling method as described above.

There may be provided a further step of computing a final real throughput value for each sub-band on the basis of the respective first and second users assigned thereto and the final power allocation for that sub-band, and comparing this final real throughput with the throughput achievable by each respective user alone on each respective sub-band, and in a case where a respective final real throughput is less than the throughput achievable by the respective user alone on any respective sub-band, revoking the second user assigned to that respective sub-band and allocating all power available for that sub-band to the respective first user.

Figure 5:
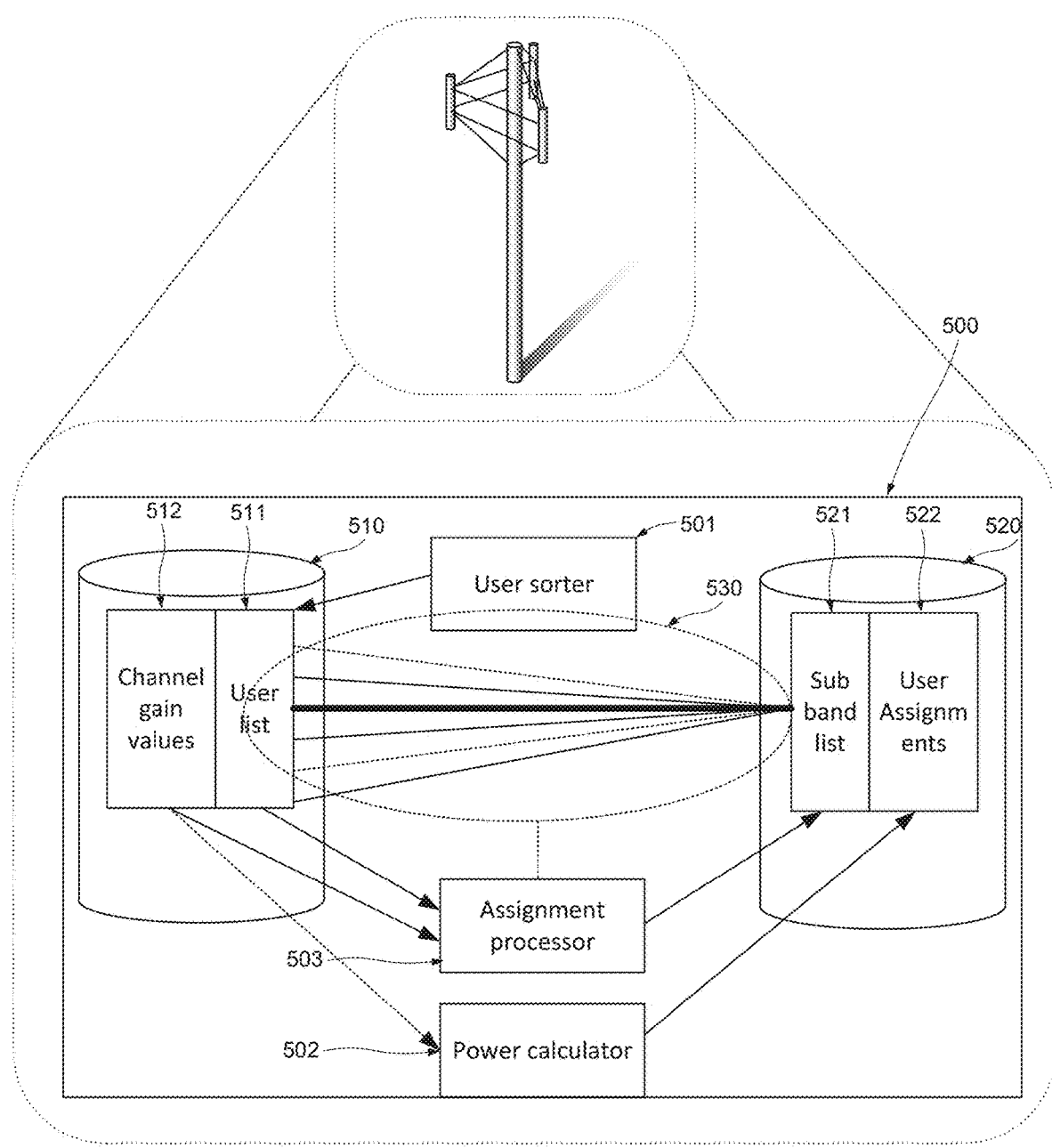
FIG. 5 shows a system according to an embodiment.

FIG. 5 shows a system according to an embodiment. As shown, there is provided a system 500 for attributing users to one or more of a plurality of sub-bands in a multiple access communications system, the system 500 comprising: a user sorter 501 adapted to sort users in order of priority according to a criterion such as channel gain, distance between the user and base station, or the user's throughput. As shown, the users are stored in a first data structure 510 presenting a user list 511, which is ordered by the user sorter 501.

The system 500 further comprises an assignment processor 503 adapted to assign, as an initial sub-band assignment, the user having the highest priority excluding any user who has already been assigned to an initial sub-band to a respective selected sub-band in a time slot t, as first user for that respective selected sub-band. The selected sub-band to which each user is assigned is selected by the assignment process as the sub-band to which no first user is currently attributed offering the highest channel gain for that user. As such, the assignment processor 503 accesses the user list 511 to obtain priority information to select the first user, and also accesses a second data structure 520 presenting a sub-band list 521, to register assignments in an associated sub-band assignments space 522.

The system 500 further comprises a power calculator 502 adapted to determine for the respective selected sub-band a plurality of candidate pairs of users for possible assignment to the selected sub-band, each candidate pair of users comprising two different users including the first user selected by the assignment processor 503 and a respective candidate second user, and to provisionally assign a power allocation to the selected sub-band for each candidate pair of users. As such, the power calculator 502 accesses the second data structure 520 to register power assignments to each candidate pair of users as stored in the selected sub-band assignments space 522. In some embodiments, depending on the approach adopted for the determination of intra sub-band power assignments, the power calculator may also access user list 511 to obtain channel gain values associated with respective users in an associated user channel gain space 512.

The assignment processor 503 may further be adapted to restrict the plurality of candidate pairs to a set of candidate pairs comprising candidate second users whose channel gain is complementary to the channel gain of the first user, and to assign the respective second sub-band user as an initial sub-band assignment to the user excluding any user who has already been assigned to an initial sub-band, belonging to the set maximizing a performance metric reflecting the achieved throughput, and/or fairness across users. As such, the assignment processor 503 may access the second data structure 520 to cancel candidate pair designations relating to non complementary combinations of users. FIG. 5 represents the candidate pair groupings by the lines 530. As shown, the first user is linked with a bold line. Candidate second users are represented by other lines, so that each candidate pair comprises the bold line and any other line. Dotted lines represent candidate second users that are not complementary with the first user, and are thus excluded by the operation of the assignment processor.

The system 500 is adapted to iteratively process users for each sub-band, until all sub-bands in the current time slot have been attributed. By the same token, the system 500 may sequentially process subsequent time slots.

It will be appreciated that alternative functional groupings may be envisaged, implementing equivalent operations.

By way of example, the system of FIG. 5 is represented as being associated with a cellular telephone tower, e.g. a base transceiving station. The skilled person will appreciate that equivalent functionality might equally be implemented in a communications device such as a telephone hand set, or in other parts of the communications network such as a Base station controller, mobile switching center, and so on.

It will be appreciated that the system of FIG. 5 or any equivalent functional grouping may further be adapted to implement the functions corresponding to any combination of the method steps described above with reference to any of FIGS. 1 to 4.

The disclosed methods and/or functional groupings may take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Thus, according to certain embodiments there, a mechanism is presented for attributing users to one or more of a plurality of sub-bands in a multiple access communications system, in which in an initial assignment phase, a first user is selected for a sub band, for example on the basis of a user priority. Users having complementary channel gains to that of the first user are identified, and then a second sub-band user maximizing a performance metric reflecting the achieved throughput, and/or fairness across users, is selected to accompany the first user on that sub-band. The initial assignment phase may terminate once all users have been assigned to a sub-band once. After the first phase is complete, the first user for each sub-band may be the user whose achieved total throughput is furthest from a target throughput defined for that user, wherein each user is assigned to the remaining sub-band to which no first user is currently attributed offering the highest channel gain for that user.

These methods and processes may be implemented by means of computer-application programs or services, application-programming interface (API), library, and/or other computer-program product, or any combination of such entities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for attributing users to one or more of a plurality of sub-bands in a multiple access communications system, the system comprising:
an assignment processor adapted to assign, as an initial sub-band assignment, a user excluding any user who has already been assigned to an initial sub-band to a respective selected sub-band in a time slot t, as first user for that respective selected sub-band,
a power calculator adapted to determine, for the respective selected sub-band, a plurality of candidate pairs of users for possible assignment to the selected sub-band, each candidate pair of users comprising two different users including the first user and a respective candidate second user, and to provisionally assign a power allocation to the selected sub-band for each candidate pair of users,
the assignment processor being further adapted to restrict the plurality of candidate pairs to a set of candidate pairs comprising candidate second users whose channel gain is complementary to the channel gain of the first user, and to assign as an initial sub-band assignment as second user for the respective selected sub-band, to the user excluding any user who has already been assigned to an initial sub-band, belonging to the set of candidate pairs maximizing a performance metric reflecting an achieved throughput, and/or fairness across users, and
wherein the system is further adapted to process users for each sub-band, until all sub-bands in a current time slot have been attributed,
wherein a complementary channel gain is a channel gain such that assigning a user having that channel gain to the selected sub-band together with the corresponding first user would indicate a total sub-band throughput greater than the sub-band throughput achievable by assigning all available power as indicated by the provisional power allocation for the corresponding candidate pair of users for the respective sub-band to the first user.

2. A method for attributing users to one or more of a plurality of sub-bands in a multiple access communications system, the method comprising the steps of:
assigning as an initial sub-band assignment a user excluding any user who has already been assigned to an initial sub-band to a respective selected sub-band in a time slot t, as first user for that respective selected sub-band,
determining for the respective selected sub-band a plurality of candidate pairs of users for possible assignment to the selected sub-band, each candidate pair of users comprising two different users including the first user and a respective candidate second user,
provisionally assigning a power allocation to the selected sub-band for each candidate pair of users,
restricting the plurality of candidate pairs to a set of candidate pairs comprising candidate second users whose channel gain is complementary to the channel gain of the first user, and
assigning as an initial sub-band assignment as second user for the respective selected sub-band, the user excluding any user who has already been assigned to an initial sub-band, belonging to the set of candidate pairs maximizing a performance metric reflecting an achieved throughput, and/or fairness across users, and
the method comprising the further steps of then repeating the steps of assigning a first user to the selected sub-band, provisionally assigning a power allocation to the selected sub-band,
assigning a second user to the selected sub-band, until all sub-bands in a current time slot have been attributed,
wherein a complementary channel gain is a channel gain such that assigning a user having that channel gain to the selected sub-band together with the corresponding first user would indicate a total sub-band throughput greater than the sub-band throughput achievable by assigning all available power as indicated by the provisional power allocation for the corresponding candidate pair of users for the respective sub-band to the first user.

3. The method of claim 2, wherein the selected sub-band to which the user is assigned as first user as an initial sub-band assignment is selected as the sub-band to which no first user is currently attributed offering the highest channel gain for that user.

4. The method of claim 2, wherein the set of candidate pairs is defined by considering each user excluding the user assigned as the first user in order of the respective channel gain values of each user for the selected sub-band, starting with the user having the highest channel gain,
  in a case where assignment of that user as a second user to the selected sub-band together with the corresponding first user would indicate a total sub-band throughput greater than the sub-band throughput achievable by assigning all available power for the respective sub-band to the first user alone, incorporating the user in the set and proceeding to the next user in order of respective channel gain values, while
  in a case where assignment of that user as a second user to the selected sub-band together with the corresponding first user would not indicate a total sub-band throughput greater than the sub-band throughput achievable by assigning all available power for the respective sub-band to the first user alone, proceeding to consider each user excluding the user assigned as the first user in order of the respective channel gain values of each user for the selected sub-band, starting with the user having the lowest channel gain, and
    in a case where assignment of that user as a second user to the selected sub-band together with the corresponding first user would indicate a total sub-band throughput greater than the sub-band throughput achievable by assigning all available power for the respective sub-band to the first user alone, incorporating the user in the set and proceeding to the next user in order of respective channel gain values, while
    in a case where assignment of that user as a second user to the selected sub-band together with the corresponding first user would not indicate a total sub-band throughput greater than the sub-band throughput achievable by assigning all available power for the respective sub-band to the first user alone, considering the set to be completely defined and proceeding to the step of assigning the respective second sub-band user for the selected sub-band.

5. The method of claim 2, wherein, once all users have been assigned to a sub-band as an initial sub-band assignment, assigning to any remaining sub-bands in the current time slot, and each sub-band in subsequent time slots, as a first user the user having the lowest total achieved throughput, wherein each user is assigned to the remaining sub-band to which no first user is currently attributed offering the highest channel gain for that user.

6. The method of claim 2, wherein once all users have been assigned to an initial sub-band, performing the further step of assigning to any remaining sub-bands in the current time slot and each sub-band in subsequent time slots as a first user being the user whose achieved total throughput is furthest from a respective target throughput defined for that user, wherein each user is assigned to the remaining sub-band to which no first user is currently attributed offering the highest channel gain for that user.

7. The method of claim 2, comprising the further step of sorting all users in order of best channel gain measured for the current time slot for each user across all sub-bands, where the user accorded the highest priority is the user having the lowest best channel gain, prior to the step of assigning, and wherein at the step of assigning the user assigned is the user having the highest priority excluding any user who has already been assigned to an initial sub-band to a selected sub-band in a time slot t.

8. The method of claim 2, wherein the second sub band user is selected as the candidate second user maximizing a metric reflecting a system throughput, subject to a factor reflecting fairness across users.

9. The method of claim 2, wherein the second sub band user is selected as the candidate second user maximizing a metric reflecting the total throughput achievable by each pair of users comprising the first user assigned to the sub band under consideration and a respective candidate second user, as a proportion of an average throughput achieved by that same pair of users over a predetermined preceding period.

10. The method of claim 2, wherein the second sub band user is selected as the candidate second user maximizing a metric reflecting the total throughput achievable by each pair of users comprising the first user assigned to the sub band under consideration and a respective candidate second user, as a proportion of a sum of deviations of the throughput of each user over a predetermined preceding period from an average throughput of all users over the predetermined preceding period.

11. The method of claim 2, wherein the second sub band user is selected as the candidate second user maximizing a matching between an average throughput of each user and an average throughput of all users over a predetermined preceding period.

12. The method of claim 2, comprising an additional step of assigning a final power allocation to each user of each sub-band.

13. The method of claim 12, wherein the step of assigning a provisional power allocation and the step of assigning a final power allocation comprises the steps of:
  determining a sub-band attenuation value proportional to a reciprocal of a square of the channel gain value of the users attributed to the selected sub-band and every sub-band to which users have been attributed for the current time slot, applying a water filling algorithm across the selected sub-band and every sub-band to which users have been attributed for the current time slot using a floor for each sub-band defined by a respective sub-band attenuation value,
  and, calculating a provisional power allocation from the water filling algorithm for the selected sub-band.

14. The method of claim 2, wherein the step of provisionally assigning a power allocation to each sub-band comprises for each sub-band for which the second respective user is to be assigned, calculating a provisional inter sub-band power allocation across all sub-bands for which assignment for the selected sub-band is considered to be complete plus the sub-band for which the second respective user is to be assigned by assuming a pro rata distribution of a total available power across all, and performing a waterfilling distribution of that provisional inter sub-band power allocation amongst the sub-bands for which assignment for the selected sub-band is considered to be complete plus the sub-band for which the second respective user is to be assigned on a basis of a waterfilling algorithm based on the channel gain of the users assigned to each sub-band.

15. A non-transitory computer readable medium storing a computer program comprising instructions which, when the computer program is executed by a computer, cause the computer to carry out the method of claim 2.

* * * * *

UNITED STATES PATENT AND TRADEMARK OFFICE
CERTIFICATE OF CORRECTION

PATENT NO. : 11,515,986 B2
APPLICATION NO. : 17/042453
DATED : November 29, 2022
INVENTOR(S) : Marie-Rita Hojeij et al.

It is certified that error appears in the above-identified patent and that said Letters Patent is hereby corrected as shown below:

On the Title Page

Item (72) Inventors:
Correct the fourth inventor's city, Catherine DOUILLARD, from "PREST" to -- BREST --.

In the Claims

In Claim 1, Column 26, Line 10, "respective selected sub-band, to the user excluding" should be
-- respective selected sub-band, the user excluding --.

Signed and Sealed this
Twenty-fourth Day of January, 2023

*Katherine Kelly Vidal*

Katherine Kelly Vidal
*Director of the United States Patent and Trademark Office*